United States Patent [19]
Sander

[11] Patent Number: 4,960,013
[45] Date of Patent: Oct. 2, 1990

[54] BICYCLE CRANK ASSEMBLY

[76] Inventor: Keith D. Sander, 12110 Inez St., Whittier, Calif. 90605

[21] Appl. No.: 445,045

[22] Filed: Dec. 4, 1989

[51] Int. Cl.⁵ .................................................. G05G 1/14
[52] U.S. Cl. ..................................... 74/594.3; 74/594.2
[58] Field of Search ................ 74/594.1, 594.7, 560, 74/562; 280/227

[56] References Cited

U.S. PATENT DOCUMENTS

| | | | |
|---|---|---|---|
| 550,206 | 11/1895 | Tompkins | 74/594.1 |
| 590,557 | 9/1897 | Wilkinson | 74/594.3 |
| 610,175 | 9/1898 | Flindall | 74/594.3 |
| 935,435 | 9/1909 | Grout | 74/594.3 |
| 4,519,271 | 5/1985 | Chattin | 74/594.3 |
| 4,706,516 | 11/1987 | Xi | 74/594.1 |
| 4,807,491 | 2/1989 | Stuckenbrok | 74/594.1 |

FOREIGN PATENT DOCUMENTS

| | | | |
|---|---|---|---|
| 659222 | 6/1929 | France | 74/594.3 |
| 851210 | 1/1940 | France | 74/594.3 |
| 929797 | 1/1948 | France | 74/594.3 |
| 957403 | 2/1950 | France | 74/594.3 |
| 973667 | 2/1951 | France | 74/594.3 |
| 2562497 | 10/1985 | France | 74/594.3 |
| 450597 | 6/1949 | Italy | 74/594.3 |
| 510087 | 1/1955 | Italy | 74/594.3 |
| 60483 | 8/1947 | Netherlands | 74/594.3 |
| 109324 | 9/1917 | United Kingdom | 74/594.3 |

Primary Examiner—Vinh T. Luong

[57] ABSTRACT

A bicycle foot pedal crank arm construction that provides a relatively long lever arm between the foot pedal and crank arm rotational axis during the power stroke; during the return stroke (upstroke) the lever arm distance is shortened. Anti-friction rollers are provided between each hollow crank arm and each associated crank arm extension to guide the extension in and out on the crank arm, with minimum tendency to wobble or bind.

7 Claims, 1 Drawing Sheet

U.S. Patent
Oct. 2, 1990
4,960,013
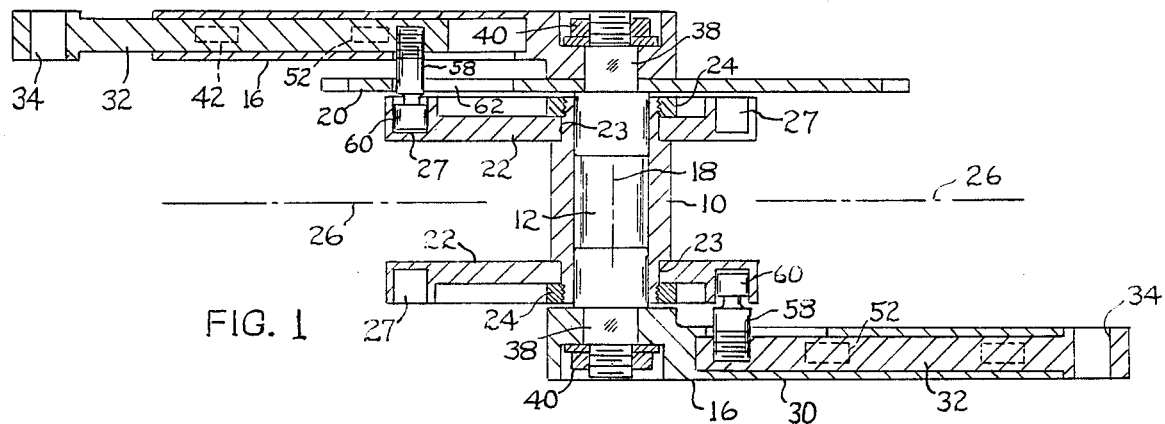
FIG. 1
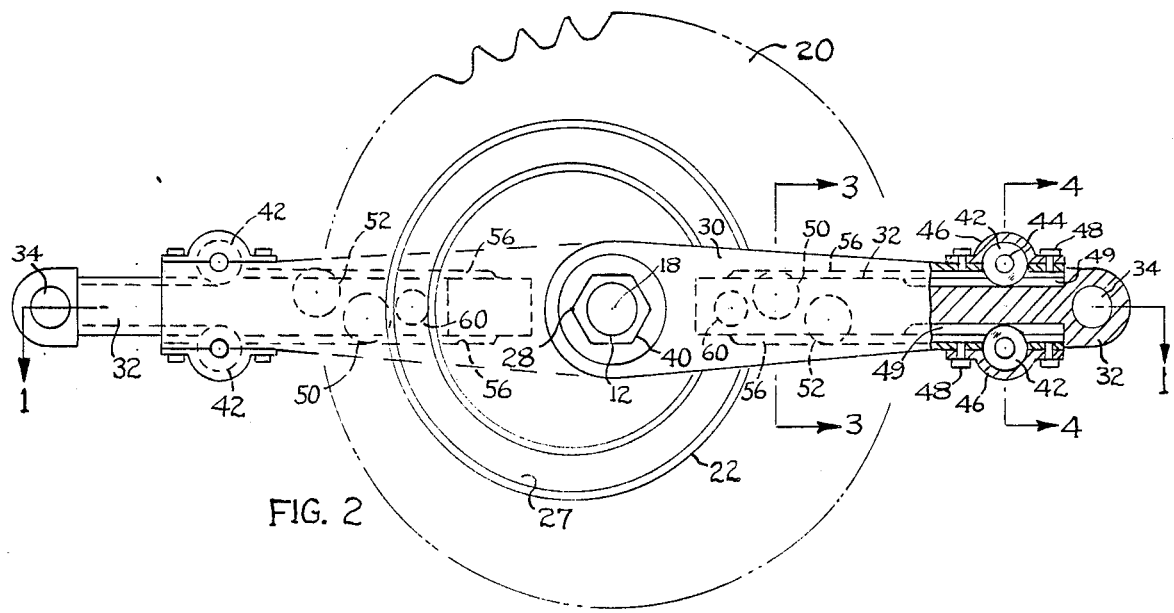
FIG. 2
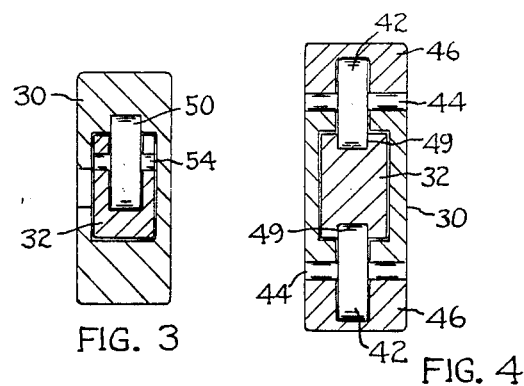
FIG. 3
FIG. 4

BICYCLE CRANK ASSEMBLY

BACKGROUND AND SUMMARY OF THE INVENTION

This relates to bicycles, and more particularly to foot pedal crank arm constructions for bicycles. According to the invention, the foot pedal crank arms include crank arm extensions that move radially in and out along the lengths of the associated crank arms so as to effectively vary the crank arm length during each crank arm revolution. During the power stroke (downstroke) the crank arm is made to be relatively long; during the return stroke (upstroke) the crank arm is made to be relatively short. Change in crank arm length is achieved automatically without any special effort on the part of the bicyclist.

By increasing and then decreasing the crank arm length during each crank arm revolution it is estimated that increased leverage can be obtained without increasing pedal travel circumference or without adversely affecting bicyclist comfort and leg action. It is believed that the rider can produce about eight percent more power or speed when using the invention, compared to conventional bicycles.

U.S. Pat. No. 550,206 to Tompkins shows a bicycle having pedal crank arms whose lengths automatically increase and decrease during each crank arm revolution. The sliding surfaces within the crank arms are flat frictional surfaces that consume substantial amounts of energy, thereby negating some of the benefits that would otherwise be achieved by the variable length crank arm feature. The present invention is an improvement on the system shown in U.S. Pat. No. 550,206. Under the present invention anti-friction roller components are incorporated into the crank arms in an effort to materially reduce the friction losses associated with flat friction surface engagements of the type present in the structure of U.S. Pat. No. 550,206.

The principal aim of the present invention is to improve the operating efficiency of the variable length crank arm construction shown in U.S. Pat. No. 550,206. A further aim of the invention is to provide a variable length crank arm construction that is relatively sturdy while being manufacturable at relatively low cost.

BRIEF DESCRIPTION OF THE DRAWINGS

FIG. 1 is a sectional view taken through one embodiment of the invention on line 1—1 in FIG. 2.

FIG. 2 is a side elevational view of the structure shown in FIG. 1.

FIG. 3 is an enlarged fragmentary sectional view taken on line 3—3 in FIG. 2.

FIG. 4 is an enlarged fragmentary sectional view taken on line 4—4 in FIG. 2.

DESCRIPTION AND PREFERRED EMBODIMENT OF THE INVENTION

The drawings show a bearing tube 10 for rotary containment (support) of a foot pedal drive shaft 12. Bearing tube 10 would be located at a central point on a bicycle about midway between the front and rear wheels of the bicycle; bearing tube 10 forms part of the bicycle frame. Drive shaft 12 extends completely through and beyond tube 10 in both directions so that opposite end portions of the shaft project beyond (outside) the ends of the tube.

At each of its ends shaft 12 carries (mounts) a foot pedal crank arm assembly 16. The actual foot pedal is connected to the outer end of the crank arm assembly (i.e. the end remote from tube axis 18), so that the bicyclist can exert foot pressure onto the pedals to drive them around shaft axis 18 and thus propel the bicycle forwardly (which is in a right-to-left direction in FIG. 1). A toothed sprocket 20 is affixed to an exposed end of shaft 12 inboard from the associated crank arm assembly 16 for transmitting the rotary force of this shaft 12 to a second sprocket carried on the axle of the bicycle rear wheel. An endless chain would be trained around the two sprockets to transmit the rotary drive force.

Circular cam plates 22 are affixed to bearing tube 10 at its opposite ends. As shown, each cam plate has a square hole mated to a square cross-sectioned area 23 of tube 10. A nut 24 is threaded onto the extreme end of the tube to prevent axial displacement of the associated cam plate.

Each cam plate has an endless cam slot 27 facing away from the imaginary central mid plane 26 of the bicycle. As seen in FIG. 2, cam slot 27 has a circular configuration centered on an axis 28 located forwardly (leftwardly) from shaft rotation axis 18. The cam slot is thus eccentric to shaft axis 18. Each cam plate is stationary relative to tube 10 and the bicycle frame.

Each crank arm assembly 16 comprises a hollow crank arm 30 affixed to one end of shaft 12, and an elongated crank arm extension 32 slidably mounted within hollow arm 30 for radial movement toward or away from the drive shaft axis 18. The outer end of each arm 30 has a transverse hole 34 therethrough that is threaded to receive the supporting shaft of a conventional foot pedal. Foot pressure applied to the pedals drives the crank arm assemblies around shaft axis 18.

Each hollow crank arm 30 includes a hub area that has a square hole therethrough adapted to mate with a square cross-sectioned shank area 38 of shaft 12. The extreme end of the shaft is threaded to receive a nut 40 for retaining crank arm 30 against axial dislocation from shank area 38. One of the two shank areas 38 is preferably longer than the other shank area in order to form a mounting structure for sprocket 20. The sprocket has a square hole adapted to have a snug fit on the square cross-sectioned shank area of the shaft, such that the sprocket is rotatable with the shaft. The sprocket 20 is located inboard from the adjacent crank arm assembly 16, i.e. nearer to the central mid plane 26 of the bicycle.

Each hollow crank arm 30 has an essentially rectangular passage or internal bore extending longitudinally therealong to slidably accommodate the associated crank arm extension 32. Clearances are provided between the interior side surfaces of the hollow crank arm and the outer side surfaces of the crank extension, such that these two components do not actually contact one another along their side surfaces.

Two anti-friction rollers 42 are carried on each crank arm 30 near its outer end. Each roller includes a shaft 44 that extends into a cylindrical bearing defined by mating semi-cylindrical recesses formed in crank arm 30 and pillow block (cap) 46. Screws 48 may be used to affix cap 46 to elongated arm 30. Each roller 42 has it peripheral edge surface arranged to ride in a groove 49 in the adjacent surface of crank arm extension 32. The two rollers provide anti-friction support for crank arm extension 32; the rollers effectively space the surfaces of extension 32 from the interior side surfaces of hollow arm 30.

Two additional anti-friction rollers 50 and 52 are carried on (within) each crank arm extension 32 near its inner end. Each roller includes an axle 54 extending through the roller into circular holes in the crank arm extension so that the roller can freely rotate on the axle axis. Each roller 50 or 52 has its peripheral edge surface arranged to ride in a slot 56 formed in the interior surface of hollow arm 30. Rollers 50 and 52 serve the same general purpose as rollers 42, namely to provide anti-friction support for member 32, while spacing the side surfaces of member 32 from the adjacent interior side surfaces of hollow arm 30.

During operation of the bicycle the foot pressure applies loadings primarily within the rotational planes of the two crank arm assemblies 16, i.e. planes normal to shaft axis 18. Rollers 42, 50 and 52 are arranged with their axles normal to the rotational planes of the associated crank arm extensions so that load forces are absorbed radially by the rollers; the rollers rotate to permit arm extension 32 to move radially in and out along crank arm 30 with minimum frictional resistance (losses).

A cam follower 58 extends from each crank arm extension 32 through a slot in the wall of hollow arm 30. The free end of each cam follower carries a roller 60 that rides in the endless slot 27 in the associated cam plate 22. In the case of one of the cam followers, the sprocket 20 is interposed between the cam plate and the adjacent crank arm assembly. Therefore, a clearance slot 62 is provided through the sprocket to permit the cam follower to move toward or away from shaft axis 18 without striking the sprocket.

During bicycle operation the eccentricity of each cam slot 27 relative to the shaft rotational axis 18 causes each cam follower 58 to move toward or away from axis 18 (while the crank arm assemblies are rotating around axis 18). Each crank arm extension 32 therefore moves in or out along hollow arm 30. In FIG. 2 the right arm extension 32 is shown in its retracted position wherein the foot pedal is relatively close to shaft axis 18; the left arm extension 32 is shown in its extended position, wherein the foot pedal is relatively far away from shaft axis 18. The eccentricities of cam slot 27 are oriented so that the pedal will be extended away from shaft axis 18 during the power stroke (downstroke); the pedal is shifted inwardly toward shaft axis 18 during the return stroke (upstroke).

A primary feature of my invention is the disposition of support rollers 42, 50 and 52. These rollers rotate in the primary load planes to guide and support the crank arm extensions 32 as they move in and out on hollow arms 30. The rollers 42 are spaced some distance away from the associated rollers 50 and 52 so that each arm extension 32 has anti-friction support at or near both of its ends, in all positions of the arm extension. Each arm extension has an essentially straight line motion, with minimum tendency to wobble or tilt or bind.

The rollers are oriented so that each roller can have a reasonably large diameter for a better rolling action (minimum frictional drag). It would be possible to dispose rollers 50 and 52 the same distance from the inner end of the associated arm extension 32 so as to bring both rollers close to the end of the arm extension. However, the rollers would then have to have smaller diameters. The staggered roller orientation shown in FIG. 2 allows rollers 50 and 52 to have reasonably large diameters. Each roller 50 or 52 has a diameter that is greater than one half of the arm extension thickness measured in the roller plane.

The arrangement shown in the drawings is believed to be an improvement on the device shown in U.S. Pat. No. 550,206, particularly as regards the inclusion of anti-friction rollers within the crank arm assemblies to reduce frictional losses as each crank arm extension rides in an out along the associated hollow crank arm.

I claim:

1. In a bicycle having a main bearing tube for rotary containment of a foot pedal drive shaft; the improvement comprising first and second cam plates affixed to said bearing tube at opposite ends thereof; each cam plate having an outwardly facing endless cam slot extending around the bearing tube axis in eccentric relation thereto; said drive shaft extending through and beyond the bearing tube in both directions so that opposite end portions thereof project beyond the bearing tube and associated cam plates; a sprocket affixed to a first one of the projecting end portions of the drive shaft; a first hollow crank arm affixed to said first projecting shaft end portion outboard from the sprocket; a second hollow crank arm affixed to the other projecting shaft end portion; individual crank arm extensions slidably mounted within the hollow crank arms for radial movement toward or away from the drive shaft axis; a cam follower extending from each crank arm extension into each associated cam slot; first roller means carried on each crank arm near its outer end for guiding and supporting the associated crank arm extension; and second roller means carried on each crank arm extension near its inner end for rolling contact with interior surfaces of the associated crank arm wherein each said second roller means comprises two rollers (50, 52) having peripheral edge contact with opposite interior side surfaces of the associated hollow crank arm; said two rollers having parallel axles extending normal to the rotational plane of the associated crank arm extension; said rollers being staggered slightly different distances from the inner end of the crank arm extension; each roller (50 or 52) having a diameter greater than one half the thickness of the crank arm extension measured in the crank arm rotational plane.

2. The improvement of claim 1, wherein each cam follower comprises a roller located within the associated cam slot.

3. The improvement of claim 1, wherein each said first roller means comprises two rollers having edge contact with opposite side surfaces of the associated crank arm extension.

4. The improvement of claim 3, wherein said two rollers have parallel axles extending normal to the rotational plane of the associated crank arm.

5. The improvement of claim 1, wherein each crank arm is connected exclusively to the drive shaft without any direct connection between the crank arm and associated cam plate.

6. The improvement of claim 1 wherein each projecting end portion of the drive shaft has a non-circular shank area, each associated crank arm having a non-circular hole therethrough mated to said non-circular shank area.

7. The improvement of claim 1, wherein one of said cam followers extends through the sprocket; said sprocket having a clearance opening there through permitting the cam follower to move radially without striking the sprocket.

* * * * *